Jan. 3, 1928.
J. R. CAUTLEY
1,655,218
BRAKE OPERATING CONNECTION
Filed July 6, 1925
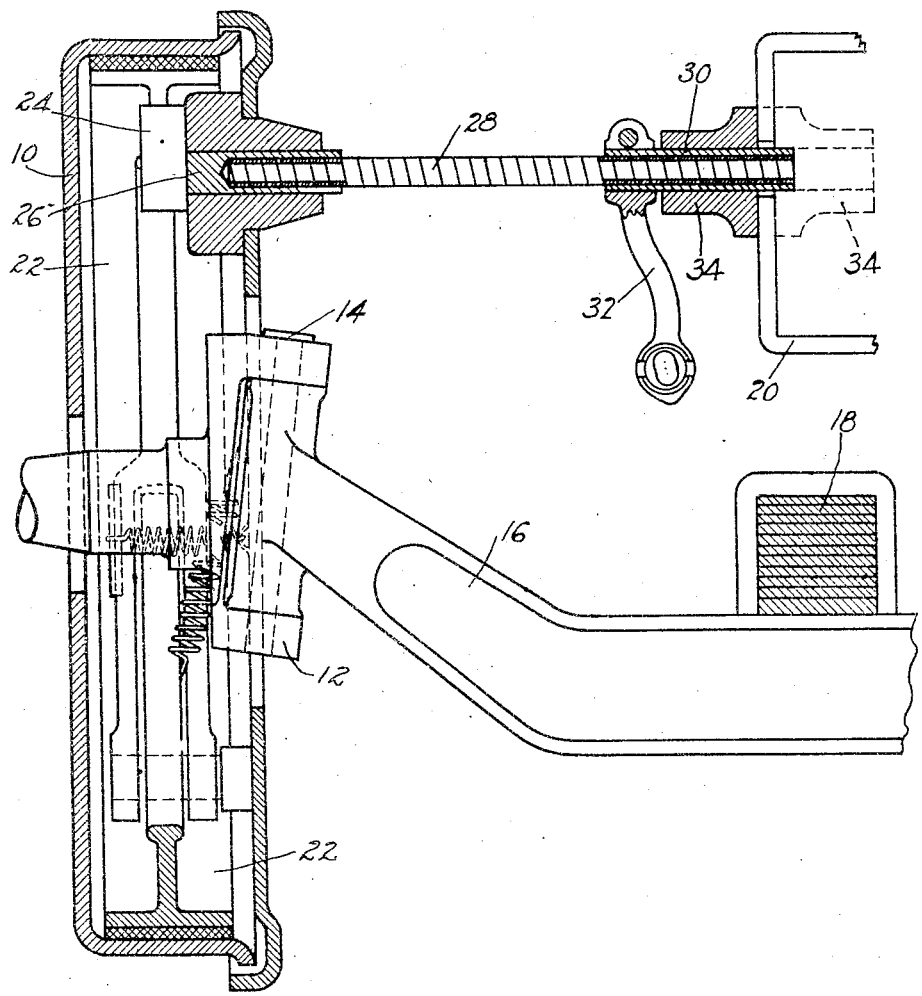
INVENTOR
JOHN R. CAUTLEY
BY
ATTORNEY Patented Jan. 3, 1928.

1,655,218

UNITED STATES PATENT OFFICE.

JOHN R. GAUTLEY, OF SOUTH BEND, INDIANA, ASSIGNOR TO BENDIX BRAKE COMPANY, OF CHICAGO, ILLINOIS, A CORPORATION OF ILLINOIS.

BRAKE-OPERATING CONNECTION.

Application filed July 6, 1925. Serial No. 41,651.

This invention relates to operating connections for a brake on a swivelling wheel and is illustrated as embodied in an operating connection for an automobile front wheel brake. An object of the invention is to produce an inexpensive control for a brake on such a swivelled wheel, eliminating most of the parts going to make up the usual universal joints, etc., by using as a brake-applying shaft a member formed of helically wound spring material. Preferably each helix used as a brake-applying shaft is closely wound from a strip rectangular in cross-section, thus giving it maximum torsional strength, especially when it is rocked about its axis in a direction which tightens the coils. The helix may, if desired, be directly connected to the brake-actuating means at its outer end, swivelling with the wheel, and is suitably supported at its inner end, as, for example, by a bracket carried by the chassis frame.

The above, and other objects and features of the invention, including various novel combinations of parts and desirable particular constructions, will be apparent from the following description of one illustrative embodiment shown in the accompanying drawings, in which:

The figure is a vertical section through an automobile front wheel brake and through associated parts of the vehicle, showing the control for the brake partly in vertical section and partly in rear elevation.

In the arrangement selected for illustration, the brake includes a drum 10 rotating with the wheel (not shown) rotatably mounted on a knuckle 12 swivelling by means of the usual king-pin 14 at one end of the front axle 16, which, with a rear axle which is not shown, supports by the usual springs 18 a chassis frame 20. The brake is illustrated as including shoes 22 applied by means shown as a double cam 24 mounted on a short cam shaft 26. The above-identified parts or their equivalents may be of any desired construction.

According to the present invention the brake is applied by a horizontal shaft 28 shown as wound in the form of a helix, or co-axial helices, from a strip which is rectangular in cross-section, so that the shaft has the maximum torsional strength. The single helix shown is connected to the cam shaft 26 or its equivalent as, for example, by being inserted into an axial recess in that shaft and secured in any desired manner. The inner end of the shaft 28 is preferably supported on the chassis frame 20 and is shown as being embraced by a sleeve 30 to which is clamped the operating arm 32 and which is slidably received in a bracket 34 fastened on the frame 20. The bracket 34 may be fastened on the outside of the frame, as shown in full lines, or on the inside of the frame, as shown in dotted lines. The parts are so arranged that operating the arm 32 to apply the brake rocks the helical shaft 28 about its axis in a direction to tighten its coils so that there is substantially no yielding between the arm 32 and cam 24, whereas the shaft is quite flexible in all directions at right angles to its axis.

While one illustrative embodiment of the invention has been described in detail, it is not my intention to limit its scope to that particular embodiment or otherwise than by the terms of the appended claims.

I claim:

1. A vehicle having a swivelled wheel with a brake and having a chassis frame and comprising, in combination therewith, a flexible brake-operating shaft swivelling at one end with the wheel and supported at the other end by the chassis frame, and means for rocking the shaft to apply the brake.

2. A vehicle having a swivelled wheel with a brake and having a chassis frame and comprising, in combination therewith, a flexible brake-operating shaft swivelling at one end with the wheel and slidably supported by the chassis frame at its opposite end, and an operating arm for rocking the flexible shaft to apply the brake.

3. A vehicle having a swivelled wheel with a brake and having a chassis frame and comprising, in combination therewith, a shaft formed of helically wound material swivelling at one end with the wheel and supported at the other end by the chassis frame, and means for rocking the helically wound shaft to apply the brake.

4. A vehicle having a swivelled wheel with a brake and having a chassis frame and comprising, in combination therewith, a shaft formed of helically wound spring material swivelling at one end with the wheel and supported at the other end by the chassis frame, and means for rocking the helically wound shaft in a direction to tighten its coils to apply the brake.

5. A vehicle having a front wheel with a brake and comprising, in combination therewith, a shaft formed of a helically wound strip rectangular in cross-section and arranged at its outer end to apply the brake, a support for the inner end of the shaft, and means for rocking the shaft to apply the brake.

6. A vehicle having a front wheel with a brake and comprising, in combination therewith, a shaft formed of a helically wound strip arranged at its outer end to apply the brake, a support for the inner end of the shaft, and means for rocking the shaft in a direction to tighten its coils to apply the brake.

7. A vehicle having a swivelled wheel with a brake and comprising, in combination therewith, a brake-operating device swivelling with the wheel, a closely wound helix formed of a strip rectangular in cross-section arranged to operate the said device, a support for the inner end of the helix, and means for rocking the helix about its axis to apply the brake.

8. A vehicle having a swivelled wheel with a brake and comprising, in combination therewith, a brake-operating device swivelling with the wheel, a closely wound helix formed of a strip rectangular in cross-section arranged to operate the said device, a support for the inner end of the helix, and means for rocking the helix about its axis in a direction to tighten its coils to apply the brake.

9. A vehicle having a swivelled wheel with a brake and having a chassis frame, and comprising, in combination therewith, a brake-operating device swivelling with the wheel, a closely wound helix arranged at its outer end to operate said device and supported at its inner end by the chassis frame, and means for rocking said helix about its axis to apply the brake.

10. A vehicle having a swivelled wheel with a brake and having a chassis frame, and comprising, in combination therewith, a brake-operating device swivelling with the wheel, a closely wound helix arranged at its outer end to operate said device and supported at its inner end by the chassis frame, and means for rocking said helix about its axis in a direction to tighten its coils to apply the brake.

In testimony whereof I have hereunto signed my name.

JOHN R. CAUTLEY.